United States Patent [19]

Portnyagina et al.

[11] 3,723,519
[45] Mar. 27, 1973

[54] METHOD OF PRODUCING ALLYLTHIOACETIC ACID

[76] Inventors: Vera Alexandrovna Portnyagina, poselok Novo-Boyarka ulitsa Bozhenko 13; Maria Ivanovna Morgun, ulitsa Pobedy 1, kv. 8, both of Kiev, U.S.S.R.

[22] Filed: Mar. 16, 1972

[21] Appl. No.: 235,402

[52] U.S. Cl............................260/526 S, 260/564 R
[51] Int. Cl..............................................C07c 149/20
[58] Field of Search....................................260/526 S

[56] References Cited

UNITED STATES PATENTS 3,029,279    4/1962    Kondo..............................260/526 S Primary Examiner—Vivian Garner
Attorney—Eric H. Waters et al.

[57] ABSTRACT

The method of producing allylthioacetic acid resides in that allyl bromide is reacted with thiourea at a temperature of 60° to 120°C, then monochloracetic acid is added to the resulting allylisothiouronium bromide and the mixture is heated at a temperature of 60° to 120°C in an alkaline medium, with subsequent isolation of the resulting desired product.

Allylthioacetic acid thus produced finds application as a catalyst for acrylonitrile polymerization, for synthesizing other high molecular compounds, as well as for producing new kinds of penicillin and in the synthesis of a number of medicinal preparations.

4 Claims, No Drawings

METHOD OF PRODUCING ALLYLTHIOACETIC ACID

The present invention relates to a method of producing allylthioacetic acid which finds application as a catalyst for acrylonitrile polymerization, for synthesizing other high-molecular compounds, and also for producing new kinds of penicillin and in the synthesis of a number of medicinal preparations.

A method of producing allylthioacetic acid is known, according to which allyl chloride (or allyl bromide) is mixed with an equimolecular quantity of thioglycolic acid dissolved in a 2 to 4 N solution of sodium hydroxide, the mixture being intensively agitated till the thioglycolic acid commences to react. Then the mixture is agitated with an ether, acidified with sulphuric acid, and the extraction with the ether is repeated. The ethereal extract is distilled and the desired product is obtained with a yield of 53 to 60 wt.% of the theoretical quantity.

The scheme of the process is as follows.

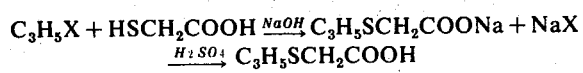

$X = Cl; Br$

The resulting allylthioacetic acid is a yellowish oily substance, with a b.p. of 103° to 105°C at 2 mm Hg; $d_{25} = 1.137$, $n^{25} = 1.5054$.

The known method is disadvantageous insofar as the process proves to be technologically complicated and lengthy. The use of water as a solvent leads to the heterogeneity of the mixture, since allyl bromide (or allyl chloride) is not soluble in water. Besides, the process requires the use of unstable, rapidly oxidizing thioglycolic acid, and the running of the reaction in alkaline medium promotes its oxidation and conversion to dithioglycolic acid.

The object of the present invention is to obviate the use of the unstable, rapidly oxidizing starting product, simplify the process technology and cut down its duration.

Said object is accomplished by a method of producing allylthioacetic acid, according to the invention, wherein allyl bromide is reacted with thiourea at a temperature of 60° to 120°C in an alcoholic medium, then monochloracetic acid is added to the resulting allylisothiouronium bromide and the mixture is heated to a temperature of 60° to 100°C in an alkaline medium, the resulting desired product being then isolated.

As an alcoholic medium it is preferable to use ethanol, methanol or isobutanol.

For accelerating the process, the reaction between allyl bromide and thiourea should be preferably carried out at a temperature of 65° to 80°C.

As an alkaline medium it is preferable to use a 20 to 30 percent aqueous solution of alkali.

The scheme of the process is as follows.

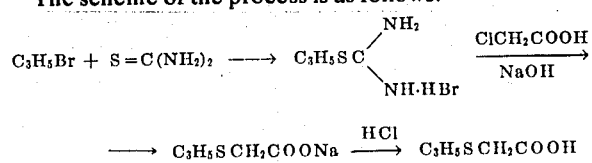

The present method is carried out in the following manner.

Allyl bromide is dissolved in an alcohol - methanol, ethanol, propanol-1, or the like. To the alcoholic solution of allyl bromide thiourea is added, and the mixture is heated at a temperature of 60° to 120°C for a period of 1 to 5 hours. The alcoholic is distilled off. The resulting allylisothiouronium bromide is dissolved in water, mixed with monochloracetic acid, alkali, preferably in the form of a 20 to 30 percent aqueous alkali solution, is added to the mixture, and the resulting composition is heated at a temperature of 60° to 100°C for 6 hours, after which it is allowed to cool and neutralized with concentrated hydrochloric acid to pH = 3. Allylthioacetic acid is extracted with ether, dried with sodium sulphate and vacuum distilled. The yield of the desired product is 50 to 60 wt.% of the theoretical quantity.

Allylthioacetic acid is a yellowish oily substance with a b.p. of 103° to 105°C at 2 mm Hg. $n^{25} = 1.5054$; $d_{25} = 1.137$.

The present method makes it possible to simplify the technology of the process and cut down its duration by obviating the formation of a heterogeneous medium and the use of thioglycolic acid which is an easily oxidizable and low-stability starting product.

The present method is also advantageous in that is requires the use of stable and easily available stock materials (thiourea and monochloracetic acid) for its realization.

For a better understanding of the present invention, given hereinbelow are examples illustrating the realization of the present method of producing allylthioacetic acid.

Example 1

33 g (23.57 ml; 0.27 mole) of allyl bromide are dissolved in 100 ml of rectified ethanol, and 20.62 g (0.27 mole) of thiourea are added to the solution. The reaction mixture is heated in a 250 ml round-bottomed flask equipped with a reflux condenser, on a water bath for 3 hours. Then the reflux condenser is replaced by a Wurtz tube, and the alcohol is distilled off, while heating on a water bath under a vacuum. The resulting allylisothiouronium bromide is dissolved in 150 ml of water and placed into a threeneck reactor equipped with a reflux condenser and a mechanically driven stirrer. Added into the reactor are 26 g (0.27 mole) of monochloracetic acid and 51.8 g (1.3 mole) of sodium hydroxide dissolved in 173 moles of water (a 30 percent solution). The reaction mixture is heated on a water bath for 6 hours and then neutralized with concentrated hydrochloric acid to pH = 3. Allylthioacetic acid is extracted with ether, dried with sodium sulphate and vacuum distilled. The yield is 22 g (60 wt.% of the theoretical quantity). B.p. is 103° to 105°C at 2 mm Hg.

Example 2

33 g (23.57 ml; 0.27 mole) of allyl bromide are dissolved in 100 ml of methyl alcohol and 20.62 g (0.27 mole) of thiourea are added to the solution. The reaction mixture is heated in a 250 ml round-bottomed flask equipped with a reflux condenser, on a water bath at a temperature of 75°C for 5 hours. Further the process is carried out as described in Example 1. The yield of the desired product is 21.15 g (58 wt.% of the theoretical quantity).

Example 3

Similarly to Example 1, the reaction mixture (allyl bromide and thiourea) is heated in isobutyl alcohol at a temperature of 110°C for 2 hours. Then the process is continued by following the procedure described in Example 1. The yield of allylthioacetic acid is 20.0 g (55 wt.% of the theoretical quantity).

What we claim is:

1. A method of producing allylthioacetic acid, residing in that allyl bromide is reacted with thiourea at a temperature of 60° to 120°C in an alcoholic medium, then monochloracetic acid is added to the resulting allylthiouronium bromide, and the mixture is heated at a temperature of 60° to 100°C in an alkaline medium, this being followed by isolation of the resulting desired product.

2. A method as of claim 1, wherein as an alcoholic medium use is made of a medium selected from the group consisting of ethanol, methanol and isobutanol.

3. A method as of claim 1, wherein the reaction between allyl bromide and thiourea is carried out at a temperature of 65° to 80°C.

4. A method as of claim 1, wherein a 20 to 30 percent aqueous solution of alkali is used as an alkaline medium.

* * * * *